(12) United States Patent     (10) Patent No.: US 6,937,335 B2
Mukai     (45) Date of Patent: Aug. 30, 2005

(54) DYNAMIC ALIGNMENT OF OPTICAL FIBERS TO OPTICAL CIRCUIT DEVICES SUCH AS PLANAR LIGHTWAVE CIRCUITS

(76) Inventor: Paul Victor Mukai, 30 Via Lucca #F207, Irvine, CA (US) 92612

( * ) Notice: Subject to any disclaimer, the term of this patent is extended or adjusted under 35 U.S.C. 154(b) by 230 days.

(21) Appl. No.: 10/094,585

(22) Filed: Mar. 8, 2002

(65) Prior Publication Data

US 2003/0169422 A1 Sep. 11, 2003

(51) Int. Cl.⁷ .............................. G01B 11/00; G02B 6/26
(52) U.S. Cl. ..................... 356/399; 356/400; 385/52
(58) Field of Search .......................... 356/73.1, 399, 356/400, 124.5; 385/24, 52, 14, 15; 398/9–17, 25–33; 250/214 R, 227.18, 227.23, 227.24, 227.11, 216

(56) References Cited

U.S. PATENT DOCUMENTS

| | | | |
|---|---|---|---|
| 5,039,191 A | | 8/1991 | Myszka |
| 5,596,662 A | | 1/1997 | Boscher |
| 5,625,450 A | * | 4/1997 | Ikeno .......................... 356/73.1 |
| 5,664,033 A | * | 9/1997 | Scheu et al. .................. 385/16 |
| 5,926,594 A | | 7/1999 | Song et al. .................... 385/49 |
| 5,970,192 A | | 10/1999 | Osugi et al. |
| 6,024,498 A | * | 2/2000 | Carlisle et al. ............... 385/56 |
| 6,108,074 A | * | 8/2000 | Bloom ....................... 356/73.1 |
| 6,122,423 A | | 9/2000 | You et al. |
| 6,175,675 B1 | * | 1/2001 | Lee et al. ...................... 385/50 |
| 6,654,523 B1 | * | 11/2003 | Cole ............................. 385/52 |

FOREIGN PATENT DOCUMENTS

| | | |
|---|---|---|
| EP | 0 545 584 A1 | 11/1992 |
| JP | 10123373 | 5/1998 |

OTHER PUBLICATIONS

Bahadori, et al., *Automated Fiber–Waveguide Array Alignment*, Journal of Optical Communications, Fachverlng Schiele & Schon, Berlin, Germany, vol. 10, No. 2, Jun. 1, 1989, pp. 54–55.

Haronian, D., *Bottlenecks of Opto–MEMS*, In *Micro–Opto–Electro–Mechanical Systems*, SPIE vol. 4075:84–92 (2000).

* cited by examiner

*Primary Examiner*—Zandra V. Smith
*Assistant Examiner*—Gordon J. Stock, Jr.

(57) ABSTRACT

An improved method and system of aligning an optical fiber or optical fiber array to an optical circuit device couples an optical signal source and an optical measuring device to the optical fiber array, the other side of which array is coupled to the same side of the optical circuit device, thereby forming an initial U-shaped optical path from the optical signal source to the optical fiber array to the optical circuit device to the optical fiber array and to the optical measuring device. The optical path is adjusted until the optical measuring device finds a characteristic of the optical signal to be satisfactory. At that time, the final alignment may be fixed or made permanent. The characteristic of the optical signal may include, for example, the intensity of the optical signal, which is preferably at a maximum or the insertion loss which is preferably at a minimum.

59 Claims, 2 Drawing Sheets

DYNAMIC ALIGNMENT OF OPTICAL FIBERS TO OPTICAL CIRCUIT DEVICES SUCH AS PLANAR LIGHTWAVE CIRCUITS

FIELD OF THE INVENTION

The field of the invention relates generally to the alignment of optical devices and more particularly, to the alignment of optical fibers and/or optical fiber arrays to optoelectronic devices in the form of planar lightwave circuits ("PLC").

BACKGROUND

Optical fibers and/or optical fiber arrays may be connected to optoelectronic devices in the form of planar lightwave circuits (PLC). The alignment of such connections is important as it affects the quality of the transmitted optical signal (e.g., its intensity and/or insertion loss). Attaching optical fibers to PLC devices is a fundamental aspect of the manufacturing and assembly process. The accuracy with which this process is executed can affect the overall device performance. Present alignment methodologies for a multi-ported optical device require the simultaneous positioning, or alignment, of at least three independent physical units, in free space. The complexity of this scheme is significant in that each unit must have its own independent positioning system. The movement of each of the positioning systems must be orchestrated in such a manner that a line-of-sight, or optically conductive path, be established through all of the units.

A large class of products utilize PLC to fiber connections. These include both active and passive photonic components such as arrayed wave gratings, lasers, filters and amplifiers. Each of these components possesses input and output ports that convey light. The best way to properly direct light to and from these ports is to convey the light with a guided wave structure. This requires the use of optical fibers or optical fiber arrays. The nature of this operation is inherently complex and time consuming. At a minimum it requires the manipulation of at least two independent fibers, each with six degrees of freedom while trying to obtain levels of precision at the submicron level.

U.S. Pat. No. 5,926,594 describes an example of this methodology. Once the optical path is established, the units' positions must be secured and made permanent relative to the other units. This operation includes the application of a bonding material that must be cured through the application of infrared radiation or thermal energy. This type of curing process may impart stresses and relative displacement between the units as the state of the curing material changes. The displacement may include warping and twisting that will affect the planarity of the finished assembly. The finished assembly itself is affixed to a rigid substrate to increase its overall mechanical strength.

The prior art approach has several disadvantages. The approach is mechanically complex because it requires a six degree-of-freedom positioning mechanism for each of the three independent units. Further, the time required for the alignment process to converge to the optimal alignment is long and extended due to an unconstrained geometry and an inherently iterative, sequential process. Also, the optimal alignment for the assembly, which comprises a series of optical paths, is no better than the insertion loss of the optically worst path of the series of paths. For example, in trying to align eight parallel optical paths, one finds that the optimal position has 0 dB insertion loss on seven of the eight paths and that the eighth path has an insertion loss of 5 dB. Assuming that this is the best one can do, the so-called best path is limited by the path having the greatest insertion loss—the 5 dB path. That path represents the worst-case insertion loss path, which is an inseparable function of the alignment of all three units. Another issue is the accumulation of mechanical tolerances. By cascading all of the alignment parameters into a single operation, it is not possible to optimize sub-alignment tasks.

Therefore, there is a need for an improved method of aligning optical fibers and/or optical fiber array structures to optoelectronic devices.

SUMMARY OF THE INVENTION

An improved method of aligning an optical fiber or optical fiber array to an optical circuit device couples an optical signal source and an optical measuring device to the optical fiber array, the other side of which array is coupled to the same side of the optical circuit device, thereby forming an initial optical path from the optical signal source to the optical fiber array to the optical circuit device to the optical fiber array and to the optical measuring device. The optical path is adjusted until the optical measuring device finds a characteristic of the optical signal to be satisfactory. At that time, the final alignment may be fixed or made permanent. The characteristic of the optical signal may include, for example, the intensity or insertion loss of the optical signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figure are not necessarily to scale, emphasis instead being placed upon illustrating the principles of the invention. All illustrations are intended to convey concepts, where relative sizes, shapes and other detailed attributes may be illustrated schematically rather than literally or precisely.

DETAILED DESCRIPTION OF THE PREFERRED EMBODIMENT

Figure 1A:
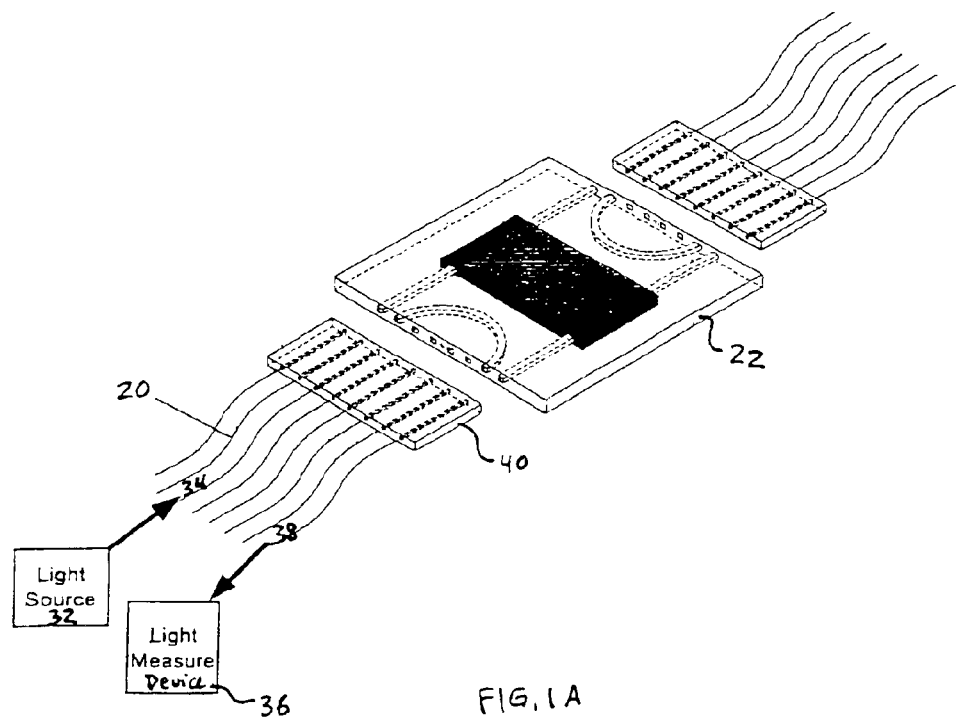
FIG. 1A is a block diagram representation of an example embodiment of an optical alignment system for aligning an optical fiber array to an optical circuit device.

FIG. 1A is a block diagram representation of an example embodiment of an optical alignment system for aligning an optical fiber or optical fiber array 20 to an optical circuit device 22 such as a PLC. The optical fiber or optical fiber array 20 may also be referred to as an optical waveguide(s) or optical element. Preferably, the optical circuit device 22 is a PLC. For convenience, the optical circuit device 22 may be referred to as a PLC 22 even though other types of optical circuit devices, such as one containing a light-guiding element in an optical fiber array, are also contemplated. The optical alignment system uses a loopback feature to provide an optical circuit path that allows an active optical alignment of the optical fiber array 20 to the PLC 22 to occur independent of the state of the PLC 22. The optical alignment system preferably is a "U"-shaped optically conductive path whose endpoints 34, 38 reside on the same side of the PLC 22. An optical signal source 32 is aimed at one endpoint 34; an optical measuring device 36 is directed to receive and measure the intensity of optical signals from the other endpoint 38. Responding to the optical measuring device 36, a control circuit 52 adjusts the alignment of the optical fiber or optical fiber array 20 by adjusting the fiber array header 40 relative to the optical circuit device 22. When the optical measuring device 36 finds the maximum intensity of the optical signal, the alignment is optimal and may be made permanent. The optical source 32 and the optical measuring device 36 may be disposed on the same chip or on different and separate structures. If the optical source 32 and the optical measuring device 36 are disposed on the same chip, the U-shaped optical path may be optionally formed on the optical fiber array 20 instead of the PLC 22. In other words, the location of the U-shaped optical path relative to the optical source 32 and optical measuring device 36 may switched so that either the U-shaped optical path is on the PLC 22 (and the optical source 32 and optical measuring device 36 are off the PLC 22), or the optical source 32 and optical measuring device 36 are on the PLC 22 (and the U-shaped optical path is on the optical fiber array 20). Other configurations may also be possible, as a person of skill in the art would be able to discern from reading this disclosure.

Figure 2:
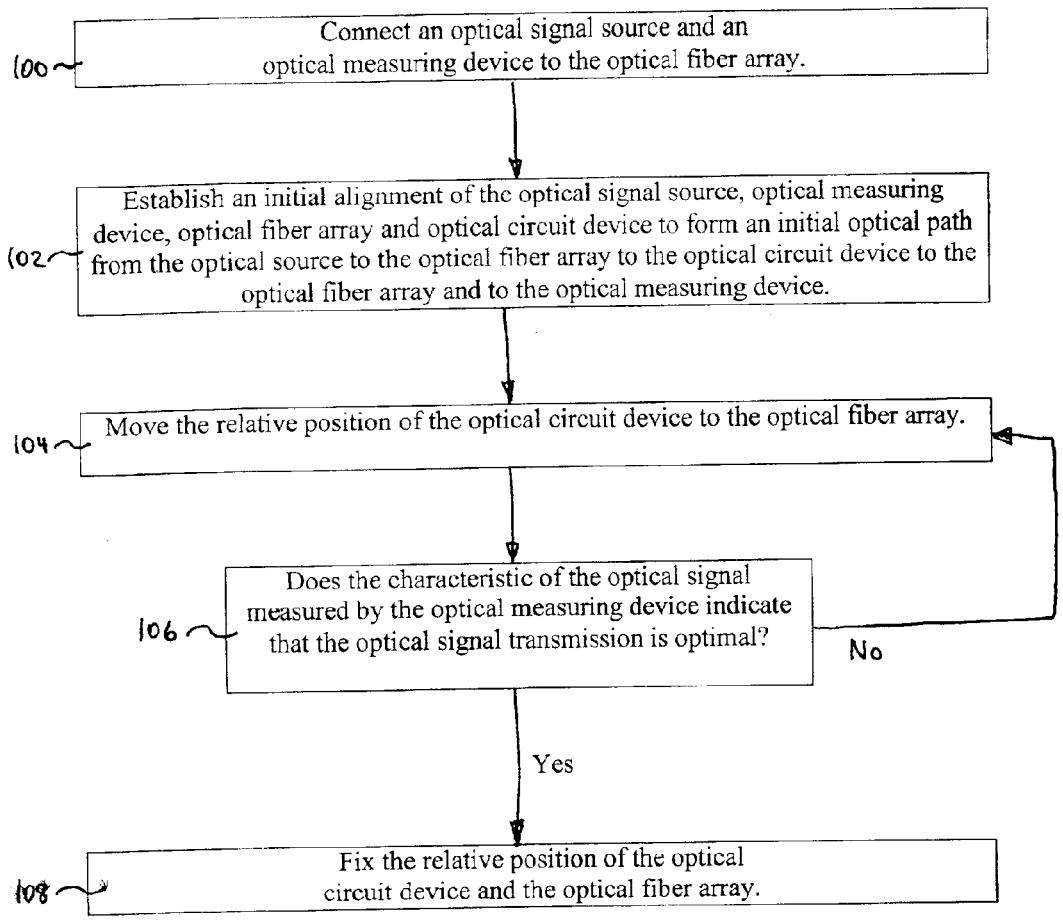
FIG. 2 is a flow chart representation for an example embodiment of an optical alignment system.

Referring to FIG. 2, to perform the improved alignment method, the following may occur:

Referring to block 100 of FIG. 2, an optical signal source 32 and an optical measuring device 36 are connected to the optical fiber array 20. The optical source 32 may include a laser diode, a laser, a tunable laser source, a light emitting diode, or any other kind of optical source used in an optical network. The optical measuring device 36 may be, for example, an optical detector, a photodiode, a charge coupled device, or any other kind of optical source used in an optical network. This arrangement creates a source path from the optical source 32 to the optical fiber array 20 to the PLC 22 and a return measure path from the PLC 22 to the optical fiber array 20 to the optical measuring device 36. The source and measure paths should be connected to unique optical fibers so that their signals do not interfere with each other.

Referring to block 102 of FIG. 2, an initial alignment of the components is established, which alignment will allow the completion of an initial optical path from the optical source 32, to the optical fiber array 20, to the PLC 22, back to the optical fiber array 20, and to the optical measuring device 36. If desired, mechanical references, or fiducial marks, may be made on the optical fiber array header 40 and the PLC 22 to assist establishing the initial alignment.

Referring to blocks 104 and 106 of FIG. 2, the PLC 22 is moved relative to the optical fiber array 20 via rotation and/or translation, or other movements, to change the optical path until the optical measuring device 36 determines that a characteristic of the optical signal received by the optical measuring device 36 is such that indicates that the optical signal transmission is satisfactory. The standards for what is satisfactory may, of course, be varied as desired. For example, the highest standard may require that the optical signal transmission is optimal. As another example, the optical signal transmission may be considered satisfactory if the measured characteristic satisfies a certain criteria or meets a specific threshold. Other standards are also contemplated.

The characteristic being measured by the optical measuring device 36 may be any characteristic of the received optical signal, such as the intensity, insertion loss, or some other characteristic of the optical signal. Preferably, the optical measuring device 36 detects the maximum intensity of the optical signal transmission (or in the alternative, detects a minimum insertion loss). Such movement of the PLC 22 relative to the optical fiber array 20 may be random or systematic, as desired. Preferably, when the intensity of the optical signal transmission reaches its maximum (or in the alternative, the insertion loss reaches its minimum), the optical alignment is deemed optimal so the PLC 22 need not be moved anymore relative to the optical fiber array 20. Of course, the method may be adapted to stop adjusting the alignment when the intensity is satisfactory or exceeds a certain threshold. Likewise, the method may be adapted to stop adjusting the alignment when the insertion loss is satisfactory or falls below a certain threshold.

Optionally, a control circuit, with or without associated software, may process information from the optical measuring device, determine whether the characteristic of the optical signal is satisfactory, and control when to stop adjusting the alignment. The control circuit and its software may be readily created by a hardware engineer and software programmer.

Figure 1B:
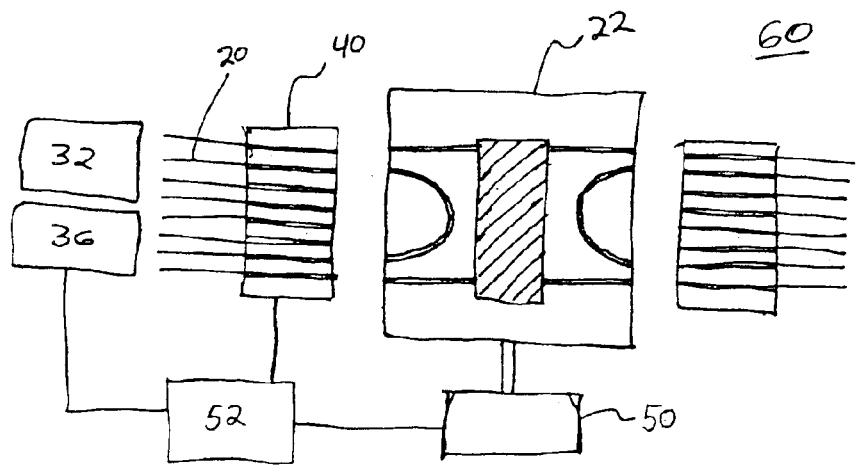
FIG. 1B is a block diagram representation of another example embodiment of an optical alignment system for aligning an optical fiber array to an optical circuit device.

As an example of controlling adjustments to the alignment, the control circuit 52 may control a movable structure 50 that is coupled to move the relative position of the optical fiber array 20 and the PLC 22. FIG. 1B is a block diagram representation of another example embodiment of the optical alignment system depicting movable structure 50 coupled with PLC 22. Here, the PLC 22, fiber array 20, fiber array header 40, light source 32 and optical measuring device 36 are all located on a common structure such as an optical device chip 60.

Referring to block 108 of FIG. 2, the relative position of the PLC 22 to the optical fiber array 20 is fixed or made permanent. For example, a bonding material may be applied between the PLC 22 and the optical fiber array header 40 to secure the relative position of the optical fiber array 20 and the PLC 22. The optimal relative position of the PLC 22 and the optical fiber array 20 are maintained until the bonding material cures. Alternatively, other methods of fixation may be used, such as adhesives or screws.

At this point, the optical alignment between the PLC 22 and the optical fiber array 20 is optimal and fixed. The entirety or a portion of the above process for aligning the PLC 22 and the optical fiber array 20 may be performed manually by a person, or by a machine such as a robot controlled by control circuitry and/or software.

This improved method for aligning optical fiber arrays 20 to a PLC 22 achieves optimal optical signal transmission even though the PLC 22 itself is in an unknown state. This method also simplifies the alignment of an optical fiber array with a multi-ported PLC 22 by reducing the need to align three independent units (input optical fiber waveguide, PLC and output optical fiber waveguide) to two units (optical fiber waveguide 20 and PLC 22). The two-unit technique is made possible by providing an independent optical path to and from the PLC device 22 where the input and output are on the same side of the PLC device 22.

The improved alignment method provides several advantages. For example, the improved method is mechanically simpler because it requires only two, six degree-of-freedom positioning mechanisms to align any two units. Of course, the method may be adapted for less than six degree-offreedom movements if one is willing to arrive at a possible alignment that may be less than optimal, but still desirable. Another example advantage is that the shorter time required for the improved alignment process to converge because the problem has been reduced from three units to two units. Yet another example advantage may be an improvement in optical performance. The overall optical performance of the composite structure may be improved because the optical power transmission at each interface is optimized separately. There is also a reduced accumulation of mechanical tolerances. By partitioning the three-unit alignment process into two two-unit alignment processes, the accumulation of error tolerances is reduced.

Further possible advantages in using the improved method for aligning optical fiber arrays to PLCs include the ability to align a single-sided optical fiber array to a PLC whose optical state is unknown, an alignment method that maximizes signal transmission when the PLC device is not flat, and the provision of an active optical path for performing connectivity testing and verification both during and after the manufacturing process has been completed.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the arts of device alignment and optical devices may similarly be incorporated as desired. Additionally and obviously, features may be added or subtracted as desired. Accordingly, the invention is not to be restricted except in light of the attached claims and their equivalents.

What is claimed is:

1. A method of aligning an optical fiber array relative to an optical circuit device, the optical fiber array being coupled to the optical circuit device, the method comprising:
    coupling an optical signal source to one end of the optical fiber array, the other end of the optical fiber array being coupled to a side of the optical circuit device, the optical signal source adapted to transmit an optical signal to the optical fiber array;
    coupling an optical measuring device to the one end of the optical fiber array, the other end of the optical fiber array being coupled to the same side of the optical circuit device, the optical measuring device adapted to measure a characteristic of an optical signal received from the optical fiber array;
    establishing an initial optical path from the optical signal source to the optical fiber array to the optical circuit device to the optical fiber array and to the optical measuring device;
    measuring the characteristic of an optical signal received by the optical measuring device from the optical fiber array; and
    moving the relative position of the optical fiber array and the optical circuit device to change the optical path until the measured characteristic indicates that the alignment of the optical path is satisfactory.

2. The method of claim 1 wherein the optical path from the optical signal source to the optical measuring device is "U"-shaped.

3. The method of claim 1 wherein the moving step changes the optical path until the measured characteristic indicates that the alignment of the optical path is optimal.

4. The method of claim 1 wherein the moving step changes the optical path until the measured characteristic indicates that the alignment of the optical path is above a threshold.

5. The method of claim 1 further comprising fixing the relative positions of the optical fiber array and the optical circuit device.

6. The method of claim 5 wherein the fixing step bonds or adheres the optical fiber array to the optical circuit device.

7. The method of claim 1 wherein the optical fiber array is a single optical fiber.

8. The method of claim 1 wherein the optical fiber array includes an optical waveguide.

9. The method of claim 1 wherein the optical signal source and the optical measuring device are coupled to different optical fibers of the optical fiber array.

10. The method of claim 1 further comprising using a mechanical reference to assist establishing the initial optical path.

11. The method of claim 1 wherein the mechanical reference is a mark made on the optical fiber array and the optical circuit device.

12. The method of claim 1 wherein the moving step moves the relative position of the optical fiber array and the optical circuit device in a random manner.

13. The method of claim 1 wherein the moving step moves the relative position of the optical fiber array and the optical circuit device in a systematic manner.

14. The method of claim 1 wherein the moving step rotates the relative position of the optical fiber array and the optical circuit device.

15. The method of claim 1 wherein the moving step translates the relative position of the optical fiber array and the optical circuit device.

16. The method of claim 1 wherein the moving step rotates and translates the relative position of the optical fiber array and the optical circuit device.

17. The method of claim 1 wherein the characteristic is the intensity of the optical signal.

18. The method of claim 17 wherein the moving step changes the optical path until the intensity of the optical signal is a maximum.

19. The method of claim 17 wherein the moving step changes the optical path until the intensity of the optical signal exceeds a threshold.

20. The method of claim 1 wherein the characteristic is the insertion loss of the optical signal.

21. The method of claim 20 wherein the moving step changes the optical path until the insertion loss of the optical signal is a minimum.

22. The method of claim 20 wherein the moving step changes the optical path until the intensity of the optical signal is below a threshold.

23. The method of claim 1 wherein the optical circuit device comprises a planar lightwave circuit.

24. The method of claim 23 wherein the optical path from the optical signal source to the planar lightwave circuit is "U"-shaped.

25. The method of claim 23 wherein the moving step changes the optical path until the measured characteristic indicates that the alignment of the optical path is optimal.

26. The method of claim 23 wherein the moving step changes the optical path until the measured characteristic indicates that the alignment of the optical path is above a threshold.

27. The method of claim 23 wherein the moving step rotates the relative position of the optical fiber array and the optical circuit device.

28. The method of claim 23 wherein the moving step translates the relative position of the optical fiber array and the optical circuit device.

29. The method of claim 23 wherein the moving step rotates and translates the relative position of the optical fiber array and the optical circuit device.

30. The method of claim 23 wherein the characteristic is the intensity of the optical signal.

31. The method of claim 30 wherein the moving step changes the optical path until the intensity of the optical signal is a maximum.

32. The method of claim 30 wherein the moving step changes the optical path until the intensity of the optical signal exceeds a threshold.

33. The method of claim 23 wherein the characteristic is the insertion loss of the optical signal.

34. The method of claim 33 wherein the moving step changes the optical path until the insertion loss of the optical signal is a minimum.

35. The method of claim 33 wherein the moving step changes the optical path until the intensity of the optical signal is below a threshold.

36. The method of claim 23 further comprising fixing the relative positions of the optical fiber array and the planar lightwave circuit.

37. The method of claim 36 wherein the fixing step bonds or adheres the optical fiber array to the planar lightwave circuit.

38. A system adapted to align a first and second light-guiding element, the system comprising:
  an optical signal source coupled to transmit an optical signal to the first light-guiding element, the first light-guiding element being coupled to and adapted to propagate the transmitted optical signal to an input of the second light-guiding element, the second light-guiding element being adapted to propagate the transmitted optical signal from its output to the first light-guiding element, the input and output of the second light-guiding element being located on the same side of the second light-guiding element;
  an optical measuring device coupled to receive the transmitted optical signal from the first light-guiding element, the first light-guiding element comprising an optical fiber array, thereby forming an optical path from the optical signal source to the first light-guiding element to the input of the second light-guiding element to the output of the second light-guiding element to the first light-guiding element and to the optical measuring device, the optical measuring device being adapted to measure a characteristic of the received optical signal;
  a control circuit coupled to the optical measuring device and to a movable structure, the movable structure being coupled to move the relative position of the first and second light-guiding elements, the control circuit processes information from optical measuring device, determines whether the characteristic of the received optical signal is satisfactory, and controls whether the movable structure moves the relative position of the first and second light-guiding elements to change the optical path;
  wherein the relative positions of the first and second light-guiding elements may be changed to alter the optical path until the optical measuring device determines that the characteristic of the received optical signal is satisfactory.

39. The system of claim 38 wherein the optical fiber array is a single optical fiber.

40. The system of claim 38 wherein the movable structure moves the relative position of the first and second light-guiding elements in a random manner.

41. The system of claim 38 wherein the movable structure rotates the relative position of the first and second light-guiding elements.

42. The system of claim 38 wherein the movable structure translates the relative position of the first and second light-guiding elements.

43. The system of claim 38 wherein the movable structure rotates and translates the relative position of the first and second light-guiding elements.

44. The system of claim 38 wherein the optical path from the optical signal source to the optical measuring device is "U"-shaped.

45. The system of claim 38 wherein the changes the optical path until the measured characteristic indicates that the alignment of the optical path is optimal.

46. The system of claim 38 wherein the changes the optical path until the measured characteristic indicates that the alignment of the optical path is above a threshold.

47. The system of claim 38 wherein the characteristic is the intensity of the optical signal.

48. The system of claim 47 wherein the changes the optical path until the intensity of the optical signal is a maximum.

49. The system of claim 47 wherein the changes the optical path until the intensity of the optical signal exceeds a threshold.

50. The system of claim 38 wherein the characteristic is the insertion loss of the optical signal.

51. The system of claim 38 wherein the control circuit changes the optical path until the insertion loss of the optical signal is a minimum.

52. The system of claim 51 wherein the control circuit changes the optical path until the intensity of the optical signal is below a threshold.

53. The system of claim 38 wherein the comprises a planar lightwave circuit.

54. The system of claim 38 wherein the optical signal source and the optical measuring device are disposed on an optical device chip.

55. A system adapted to align a first and second light-guiding element, the system comprising:
  an optical signal source coupled to transmit an optical signal to the first light-guiding element, the first light-guiding element being coupled to and adapted to propagate the transmitted optical signal to an input of the second light-guiding element, the second light-guiding element comprising an optical circuit device, the optical circuit device including a planar lightwave circuit, the second light-guiding element being adapted to propagate the transmitted optical signal from its output to the first light-guiding element, the input and output of the second light-guiding element being located on the same side of the second light-guiding element;
  an optical measuring device coupled to receive the transmitted optical signal from the first light-guiding element, thereby forming an optical path from the optical signal source to the first light-guiding element to the input of the second light-guiding element to the output of the second light-guiding element to the first light-guiding element and to the optical measuring device, the optical measuring device being adapted to measure a characteristic of the received optical signal;

a control circuit coupled to the optical measuring device and to a movable structure, the movable structure being coupled to move the relative position of the first and second light-guiding elements, the control circuit processes information from optical measuring device, determines whether the characteristic of the received optical signal is satisfactory, and controls whether the movable structure moves the relative position of the first and second light-guiding elements to change the optical path;

wherein the relative positions of the first and second light-guiding elements may be changed to alter the optical path until the optical measuring device determines that the characteristic of the received optical signal is satisfactory.

56. The system of claim 55 wherein the movable structure moves the relative position of the first and second light-guiding elements in a random manner.

57. The system of claim 55 wherein the first light-guiding element includes an optical fiber array.

58. The system of claim 55 further comprising a single optical fiber coupled to the first light-guiding element.

59. The system of claim 55 wherein the optical signal source and the optical measuring device are disposed on an optical device chip.

* * * * *